Patented Mar. 2, 1954

2,671,028

UNITED STATES PATENT OFFICE 2,671,028

METHOD AND MEANS FOR INDICATING PRODUCT DETERIORATION

James d'A. Clark, Longview, Wash.

No Drawing. Application October 17, 1949,
Serial No. 121,889

11 Claims. (Cl. 99—192)

This invention relates to a method and means for indicating spoilage or deterioration of food, or biological products, or non-biological products that deteriorate in a way similar to biological products under the influence of time and warmth, and more particularly to a method and means for the visual indication of the deterioration of food and other cold-stored products which are subject to spoilage under improper or under prolonged storage.

This application discloses new matter beyond that of my copending application Serial No. 618,391, filed September 24, 1945, now U. S. Patent 2,485,566, which covers the indication of deterioration or spoilage of a product by means of visual changes brought about by bacteria in a suitable substrate in a transparent holder, attached to the product.

With the growing practice of the use of freezing as a means of preserving perishable foodstuffs and the use of low temperatures for preserving biological or other preparations that deteriorate at normal temperatures and their distribution in small packages, it is often necessary to know that the product in the package is fresh at the time of purchase or use. Especially with the advent of precooked foodstuffs there is danger of improper storage or transit conditions resulting in the development of bacterially and/or enzymatically caused decomposition in the product to a point where its consumption would be unpleasant or even result in serious consequences.

In the case of certain products like fish or even meat, freezing and keeping at moderately low temperatures below freezing, does not prevent deterioration of the flavor of the product after a few months, and unless the storage temperature is very low, after the passage of longer time the product becomes unpalatable, then inedible.

Packaged products which are not hermetically sealed are subject to oxidation by air in or permeating through the container. This may supplement deterioration caused by any bacteria and/or enzymes present. Both oxidative and enzymatic action increase with temperature in accordance with Van't Hoff's rule. Temperature has a similar effect on bacterial action except that its effect ceases at 0° C., whereas some non-bacterially caused oxidative and enzymatic actions proceed below 0° C. at a sufficient rate to be appreciable after a prolonged period. With the growing practice of placing small quantities of perishable products such as fresh fish, meats and vegetables or vaccines and similar biological preparations, in individual or small packages for distribution, the presence of the covering material and other factors make it difficult for the user to decide upon the state of freshness. Freshness may be reduced by any or all of the three actions mentioned, in accordance with an integral function of time and temperature, the nature of the product and the properties of the package.

One of the objects of this invention is to provide a simple and sure method whereby the recipient of a package of perishable product, such as foods, biological preparations and the like, can be assured that upon receipt, such product has not been subjected to conditions which would have stimulated the activity of enzymes, bacteria or other degradative systems in the product for a long enough period to have resulted in a substantial deterioration of the product.

It is a further object of the invention to provide for a method of indicating spoilage in a package by inserting or attaching to the package an indicator comprising an enzymatic system which exhibits a change in appearance when the package has been subjected to storage conditions likely to have substantially deteriorated or degraded its contents.

Another object of the invention is to provide a simple visual device for indicating whether or not during storage, a package of a perishable product has been subjected to conditions stimulating the degradation of the product for a long enough period to be harmful, or to have resulted in a substantial deterioration of the product.

A further object of this invention is to provide an indicating means having an enzymatic system on a substrate and a pH-change responsive means which changes in appearance under the influence of a predetermined enzymatic activity.

Other objects and advantages of the present invention will appear in this disclosure and in the appended claims.

The foregoing objects are attained by including or attaching to the package of the product an indicator which contains an enzyme and a substrate selected so as to result in a permanent visible change when the package has been subjected to conditions resulting in a permanent degree of deterioration of the product.

A system adapted to indicate a substantial degree of biological or similar degradation within the package consists of a transparent container or cell associated with the package in which cell, enzymatic action analogous to the result of accumulated biological or similar action within the package is visually observable. For instance, such visual observation is afforded by an indicator responsive to pH change caused by enzymatically produced acid or alkali inside the cell changing in color, or by another indicator whose color or appearance changes by reduction, oxidation or other effect of the enzyme on a suitable substrate. In another indicator, enzymatic action may be evident by liquefaction of a solid substrate and in another by the generation of gas from the substrate. Thus, a biological or analogous activity resulting in a change within the packaged product, is simulated by an enzymatic process visible from the outside of the package.

The cumulated activity of a specifically selected enzyme and substrate which may result in an observable change in the appearance of the system is governed by its temperature (approximately in accordance with Van't Hoff's rule) and the elapsed time at that temperature (approximately with the square root of the time) and by the following additional factors, which together with the choice of enzyme and substrate, provide convenient means for adjusting the indicator to provide a visible change after a predetermined temperature-time integral has occurred, that is, after a predetermined amount of cumulated biological or similar activity has occurred within the package: (a) initial concentration of the enzyme (b) concentration of any activator or inhibitor present such as a co-enzyme or a salt (c) pH of the substrate (d) buffering or delaying means in the indicator system, to absorb the effects of a certain amount of enzymatic activity without affecting the appearance of the system. Thus, by selecting the system and varying these factors, I provide simple and effective methods for indicating the occurrence of reactions similar to biological activity, from a few minutes at low temperatures to several years at normal temperatures.

One simple form of the present invention may consist of a small area of a suitable absorbent medium such as blotting paper dyed or impregnated with a suitable pH indicator, then coated or impregnated with a suitable substrate and an enzyme system capable of producing either alkali or acid to change the color of the pH indicator. This arrangement may be enclosed by a transparent covering and/or placed beneath a transparent wrapper of a packaged product, where it may be seen. The package and contents are then placed in storage, which may be cooled or frozen as may be required to preserve the contents of the package for the desired time. If for any reason during storage, the temperature of the package is raised sufficiently for a long enough cumulated time to cause an undesirable cumulated biological or similar activity of the contents of the package, then the enzyme system indicator also will have had favorable conditions for activity. As described, the substrate and enzyme as selected and adjusted so that the pH indicator changes color when the predetermined degree of biological or similar activity has occurred to the contents of the package, such that they have become deteriorated, off-flavor, unpalatable, or inedible before the color or change of the indicator becomes evident.

An enzyme system suitable for the indicator system described in the preceding paragraph is a dilute solution of glycolase, and as the substrate a few percent glucose solution preferably thickened with agar, and buffered with a 2 percent pH 8.0 citrate or phosphate-soda buffer. A litmus indicator would change from blue to red when the enzyme had converted sufficient of the hexose to lactic acid. Another form of indicator in a closed glass capsule, containing at one end a solution containing a 1 percent solution of asparagine and a 0.01 percent solution of asparaginase (an amidase), this mixed solution being thickened with agar, a band of gelatin in the middle of the capsule to separate the mixed solution from the other end of the capsule, the other end containing an agar-thickened, citrate buffered (to pH 6.0), brightly colored solution of phenol red. The enzyme system upon activation, produces ammonia gas which permeates the gelatin layer and, depending on the concentration of the buffer in the indicator, will turn its color from bright yellow to bright red, after exposure to conditions resulting in a predetermined amount of biological or analogous action to the contents of the package.

Reductases, obtained from animal tissue, may be used as an indicator, for example with methylene blue (under anaerobic conditions) which they will reduce to its colorless base. The time-temperature reaction may be controlled by the type and concentration of the reductase and co-enzymes and the pH of the system.

Peroxidases, conveniently obtained from seedling sprouts, malt, or horseradish, in the presence of a little peroxide, will oxidise a large number of substances which may serve as indicators. Thus, gum guaic or guaiaconic acid turns blue and o-cresol gives a brownish-green color.

An oxidase system provides a simple indicator. Apple or pear or peach juice containing their oxidases may be applied to a piece of absorbent paper and sealed in a transparent container under aerobic conditions; pieces of the fresh fruit so sealed would also serve. When the ensemble is frozen and then subsequently thawed, the fruit juice (or fruit piece) gradually browns due to what is believed to be an enzymatically caused oxidation-reduction reaction. The rate of browning may be retarded by adding a suitable agent such as a dilute chloride, sulphite or ascorbic acid, or a salt may be added to keep the pH of the system slightly away from the optimum point.

Lipases are especially suitable for indicating a flavor deterioration of fish and meat after prolonged storage in a frozen condition; their action on fats is analogous at low temperatures. As an example of an indicator of this type, the following solution is enclosed in a transparent capsule: a 1.0 per cent solution of a sorbitol ester of a fatty acid (such esters are marketed under the trade name of "Tween"), 0.01 percent of pancreatin U. S. P., a pH 8.0 phosphate buffer so as to give the solution a molarity of about one-fifth and enough litmus to give a desirable depth of blue color. By decreasing the percentage of pancreatin or by increasing the molarity of the buffer or its pH, the cumulative activity of the enzyme may be extended before the litmus is turned red. By increasing the enzyme or decreasing the buffer or its pH, sufficient fatty acid will be released to turn the litmus red with less cumulative enzymatic activity. In this manner, the indicator may be adjusted so that it becomes red after a preselected degree of deterioration of the contents of the package to which the indicator has been affixed, has been reached.

One of the many gas producing enzymes and substrates, such as zymase and a hexose, enclosed in a transparent, sealed, flexible container (e. g. of vinyl chloride-vinilidene chloride copolymer material, such as made by Dow Chemical Company under the name "Saran") may serve well as an indicator in cases where the extent of the biological action that has taken place, is desired to be approximately known; the extent will correspond approximately to the volume of visible gas produced. A more exact measure could be made if the substrate were titrated or otherwise analyzed before and after storage. With this procedure there is no need to use a special indicator in the container; the gas generated serves as the indicator. The use of a rigid container would permit a certain amount of action to occur without an indication, the initial gas being dissolved in the liquid substrate; this may be advantageous in many applications.

As a further example of an indicator suitable for the purpose of this invention, a transparent container may be filled with a mixture of a granulated gel of a protein such as gelatin and some proteolytic enzyme such as pepsin, dry starch or dry powdered sugar, and a trace of dry water-soluble dye powder. The appearance of the dry mixture will be white; however after storage favoring biological activity, the gel particles will be liquefied by enzymatic action and the entire contents of the container will be turned the vivid color of the dyestuff. The extent of the activity within the package before the indicator changes may be regulated as already discussed and in addition by the percentage of water used in the gelled particles and the proportion of powdered starch or sugar mixed with these particles.

The temperature coefficients of the enzymatic indicators at various temperatures (the rate of activity at those temperatures) for most purposes will be sufficiently similar to the temperature coefficients of the biological product to be stored, so that no secondary adjustment to the formulation of the indicator for this purpose will be necessary. However, if this secondary adjustment is needed the neach of the factors controlling the time-temperature integral, the pH concentration of the enzyme, the buffer, salts and other materials and so forth, may be studied experimentally with respect to its individual effect on the temperature coefficient of the indicator as well as its cumulative activity, and the formulation of the indicator varied accordingly to best suit the particular product. In some instances, a small portion of the product itself may be advantageously employed for at least part of the substrate and/or enzyme for the indicator system.

Enzymatic action is, or may be adjusted so that over a range of normal temperatures, it is similar to many chemical and physical reactions with respect to time and temperature. Thus, enzymatic indicators may be applied in the manner disclosed, not only to foods and biological products, but to other preparations such as emulsions or suspensions subject to coagulation, or to other products subject, for example, to polymerization after such products or preparations are stored for a period at a range of normal or low temperatures.

In general, there will not be a sharp change in the appearance of the indicator, so that the degree of deterioration of the product can be assessed as none, slight, or considerable, in accordance with the degree of change of color or appearance of the indicator.

In applying the method and device of this invention to frozen products, the indicators may be made and kept frozen till applied, or made and very soon applied, and attached to each package of the product prior to or just after its contents are frozen. If storage conditions subsequently cause deterioration of the product, they also will have caused analogous activity in the enzyme system of the indicator, to produce an irreversibly observable change and thus give a danger signal to the ultimate recipient of the product.

Enzymatic systems are particularly suited for use as a spoilage indicator in accordance with this invention, because a large number of them are obtainable in a pure or a standardized form. Unlike bacteria, which are subject to mutation and to somewhat uncertain activity, enzymes have a fixed potency and may be very accurately measured out, so that a formula for an indicator for a desired purpose may be reproduced with a high degree of certainty and precision.

While the invention has been described in more or less detail, it is not to be limited to such details, as changes may be made in the procedure, form, arrangement and construction of parts, and equivalents may be substituted, without departing from the spirit and the scope of the invention as defined in the appended claims, the forms hereinbefore described being merely preferred embodiments thereof.

Having thus fully described my invention, I claim:

1. The method of indicating that a product has been under time and temperature conditions favoring appreciable deterioration, comprising placing adjacent to the product an enzyme system and a visual indicator responsive to enzyme action, which indicator assumes a change in appearance after the ensemble has been subjected to time and temperature conditions producing appreciable deterioration of the packaged product.

2. The method of indicating that a product has been kept under temperature conditions favoring an appreciable deterioration, comprising placing adjacent to the product an enzyme system substantially inactive under proper cold-storage conditions for said product but increasing in activity with rise in temperature, and an indicator responsive to enzymatic action, which indicator assumes a change in appearance after the ensemble has been subjected to conditions permitting an undesirable degree of deterioration.

3. In a package for a product susceptible to deterioration by time and warmth, an indicator for registering the occurrence of conditions favoring appreciable deterioration of the said product, said indicator comprising a container associated with said package, said container containing an enzyme system and a substrate whose appearance changes after a predetermined cumulative amount of enzymatic action.

4. A packaged product subject to deterioration by storage conditions, and associated therewith a container containing an enzyme and substrate system, the activity of said system being substantially proportional to that of the product at storage temperatures, and means associated with the enzyme system and container to give an indication when a predetermined amount of activity has occurred.

5. A packaged product subject to deterioration with time and warmth in combination with an indicating device for indicating deterioration of the product, the device comprising a cell, said cell containing an enzyme system substantially inactive under proper conditions for said product but increasing in activity with rise in temperature, and a pH-change-responsive dye, whereby when time and temperature conditions favor a predetermined deterioration of the product, said enzyme system will change the color of the dye.

6. A package for a product susceptible to deterioration with time and warmth, said package comprising an outer covering for said product and an indicator adjacent said outer covering, said indicator comprising a transparent sealed cell carrying an enzyme system substantially inactive under proper storage conditions for said product but increasing in activity with rise in temperature, and a substrate adapted to change appearance upon substantial activity of said enzyme system.

7. A packaged product subject to deterioration with time and warmth with a transparent cell containing a liquefying enzyme in a solid substrate said enzyme in said substrate having an activity with respect to temperature substantially the same as that of the product.

8. A packaged product subject to deterioration with time and warmth, with a device containing a gas-producing enzyme and substrate having an activity with respect to temperature, substantially the same as that of the product, and means incorporated in the device for indicating the quantity of gas so produced.

9. A packaged product subject to deterioration with time and warmth, with a cell containing a pH changing enzyme and substrate having an activity with respect to temperature substantially the same as that of the product, and a pH-change-responsive dye within the cell which will change appearance after predetermined time and temperature conditions.

10. A packaged product subject to deterioration with time and warmth in combination with an indicating device for indicating deterioration of the product, the device comprising a cell containing a solid substrate and an enzyme capable of liquefying said substrate, said enzyme being substantially inactive during proper storage conditions but active when conditions favorable to deterioration of said packaged product occur, whereby sufficient activity of said enzyme in said substrate will indicate the existence of improper storage conditions by its liquefication.

11. A packaged product subject to deterioration with time and warmth in combination with an indicating device for indicating deterioration of the product, the device comprising a cell containing a solid substrate, a soluble dry dye and an enzyme capable of liquefying said substrate, said enzyme being substantially inactive during proper storage conditions but increased in activity when conditions favorable to deterioration of said packaged product occur, whereby upon sufficient activity of said enzyme, said substrate will be liquefied and said dye will be dissolved in the liquefied substrate and thereby indicate the occurrence of improper storage.

JAMES D'A. CLARK.

References Cited in the file of this patent

UNITED STATES PATENTS

| Number | Name | Date |
| --- | --- | --- |
| 2,359,052 | Scharer | Sept. 26, 1944 |
| 2,460,215 | Chase | Jan. 25, 1949 |
| 2,553,369 | Hoffman | May 15, 1951 |